United States Patent [19]

Krich

[11] Patent Number: 4,797,806
[45] Date of Patent: Jan. 10, 1989

[54] HIGH SPEED SERIAL PIXEL NEIGHBORHOOD PROCESSOR AND METHOD

[75] Inventor: David M. Krich, Peoria, Ariz.

[73] Assignee: GTX Corporation, Phoenix, Ariz.

[21] Appl. No.: 16,230

[22] Filed: Feb. 19, 1987

[51] Int. Cl.⁴ .............................................. G06F 15/20
[52] U.S. Cl. ..................................... 364/900; 358/903
[58] Field of Search ... 364/200 MS File, 900 MS File; 382/41, 44; 358/903, 256

[56] References Cited

U.S. PATENT DOCUMENTS

| | | | |
|---|---|---|---|
| 3,737,855 | 6/1973 | Cutaia | 340/146.3 |
| 4,363,104 | 12/1982 | Nussmeier | 364/515 |
| 4,389,677 | 6/1983 | Rushby et al. | 358/280 |
| 4,398,256 | 8/1983 | Nussmeier et al. | 382/41 |
| 4,426,629 | 1/1984 | Fouse | 333/165 |
| 4,484,349 | 11/1984 | McCubbrey | 382/49 |
| 4,496,985 | 1/1985 | Jensen et al. | 358/151 |
| 4,499,597 | 2/1985 | Alves | 382/41 |
| 4,499,598 | 2/1985 | Chittineni | 382/54 |
| 4,506,301 | 3/1985 | Kingsley et al. | 358/280 |
| 4,506,382 | 3/1985 | Hada et al. | 382/27 |
| 4,510,618 | 4/1985 | Ataman et al. | 382/54 |
| 4,550,437 | 10/1985 | Kobayashi | 364/200 |
| 4,669,043 | 5/1987 | Kaplinsky | 364/200 |
| 4,691,233 | 9/1987 | Acampora | 358/136 |
| 4,698,666 | 10/1987 | Lake et al. | 358/22 |
| 4,706,260 | 11/1987 | Fedele et al. | 358/133 |
| 4,720,780 | 1/1988 | Dolecek | 364/200 |

OTHER PUBLICATIONS

"Cytocomputers:Architectures for Parallel Image Processing", Lougheed et al., PrePrint from IEEE Workshop on Picture Data Description & Mgmt, Aug. 1980, Environmental Research Institute of Michigan, Ann Arbor, Mich.

"Real-Time Image Enhancement Using 3×3 Pixel Neighborhood Operator Functions", Joseph E. Hall et al., Optical Engineering, May/Jun. 1980, vol. 19, No. 3, pp. 421–424.

Primary Examiner—David Y. Eng
Attorney, Agent, or Firm—Cahill, Sutton & Thomas

[57] ABSTRACT

A serial pixel neighborhood processor serially receives successive rows of pixels at a 10 MHz rate, and operates on three digit by three digit pixel "neighborhoods" to serially output filtered pixels at the 10 MHz rate. The processor includes first through sixth 16 kilobit memories. Odd numbered rows of pixels are serially written into the first memory and even numbered rows of pixels are serially written into the fourth memory. Odd numbered rows of pixels in the first and second memories are serially shifted into the second and third memories, respectively, while even numbered rows of pixels are being written into the fourth memory. Similarly, even numbered rows of pixels in the fourth and fifth memories are serially shifted into the fifth and sixth memories, respectively, while odd numbered rows of pixels are being written into the first memory. The outputs of all of the memories are multiplexed into three bit serial to parallel converters. The nine outputs of the three serial-to-parallel converters produce nine bit pixel neighborhoods each centered about a successive object pixel at the ten MHz data rate. The nine bit pixel neighborhoods are gated into a read only memory that stores various selectable filtering algorithms and serially outputs filtered pixels at the 10 MHz data rate.

16 Claims, 7 Drawing Sheets

FIG_1 (PRIOR ART)

FIG_2 (PRIOR ART)

FIG_3

HIGH SPEED SERIAL PIXEL NEIGHBORHOOD PROCESSOR AND METHOD

BACKGROUND OF THE INVENTION

The invention relates to apparatus and methods for receiving high speed serial data arranged in rows from a scanner and performing filtering operations on each pixel based on the states of a neighborhood of pixels surrounding that pixel, and more particularly to such a device that is capable of serially outputting filtered data or pixels at the same rate that unfiltered pixels or data are received.

In various applications, high speed serial data arranged in rows to form pages or screens is produced by a serial scanner that scans the rows and outputs the data serially. For example, a CCD (charged coupled device) or a video scanner may produce serial pixel data at a 10 MHz rate. Each row of scanned data may include, for example, 1000 pixels followed by an "end of row" signal, and after, for example, 1000 rows have been scanned, an "end of page" or end of screen signal may be produced. Each pixel code may be a logical "0", representing a light area or a logical "1" indicating a dark area, or each pixel code may be a multi-bit code representing a wide range of colors, from transparent through black.

A major problem faced in some applications is how to deal with "noise", i.e., extraneous spots or irregularities of the surface or item being scanned. It is very desirable to be able to filter such noise information out of the pixel data.

Figure 1:
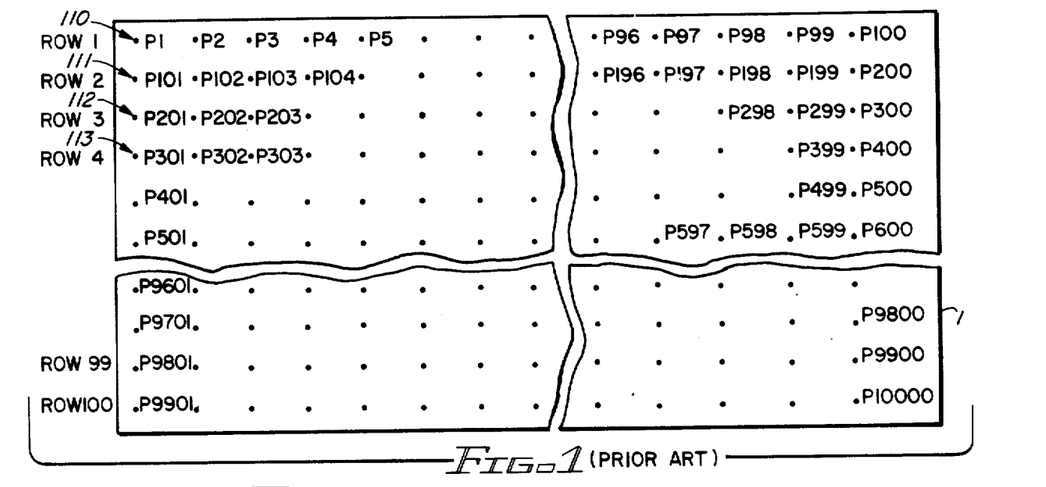
FIG. 1 is a diagram illustrating the order of scanning of pixels representing an image.

In the field of image enhancement of video signals received from communications satellites, for example, a technique for filtering the pixel data involves processing a high speed string of serial pixel codes by feeding them into a high speed computer, and executing filtering algorithms that examine three pixel by three pixel neighborhoods as they would appear on a display screen. FIG. 1 shows a simplified screen of data in which P1, P2, P3, etc., represent pixel codes that are serially output. In the example of FIG. 1, each row includes 100 pixels, and each page or screen includes 100 rows, although in many applications there typically would be 3400 pixel codes per row, and 3400 rows per page or screen.

Figure 2:
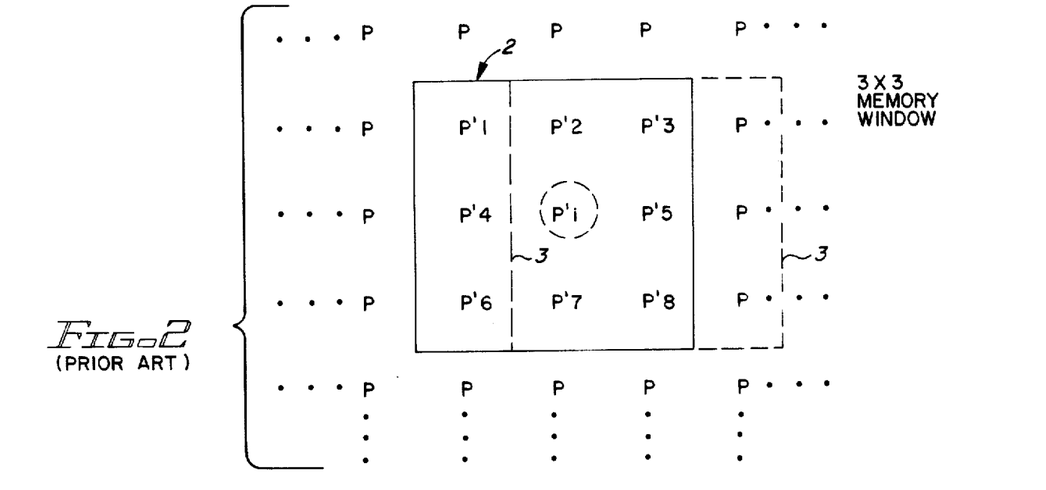
FIG. 2 is a diagram illustrating a three by three neighborhood to be filtered in an information or image enhancement operation.

In FIG. 2, reference numeral 2 designates a three by three pixel neighborhood centered about a "present" or "object" pixel P'i. The above-mentioned filtering algorithm produces a new filtered value of P'i based on the values of neighborhood pixels surrounding P'i within the solid line designating the neighborhood 2. Next, the neighborhood 2 shifts one pixel to right, as indicated by the dotted lines 3, and the object pixel would become P'5, and its filtered value, based on the eight surrounding neighborhood pixels, would be computed by the filtering algorithm.

In determining the filtered value for P'i, the algorithm takes a suitable weighted average of all nine pixel codes within neighborhood 2. Then, the neighborhood 2 is moved one pixel to the right, as indicated by dotted lines 3, and the filtering alogrithm is re-executed for the object pixel in the center of that neighborhood 3. This procedure of shifting the object neighborhood by one pixel and computing a new weighted average for the object pixel thereof is repeated for every incoming pixel code to obtain the filtered pixel code values, which then are serially output to a conventional display memory or the like. The filtered pixel codes then are serially fed from the display memory to a display screen so that a filtered image appears without the above-mentioned extraneous noise images picked up by the scanning apparatus.

A problem with the above-described technique is that the execution of the filtering algorithm by a computer is very time consuming. Each of the nine pixel codes in each neighborhood has to be accessed at least once, and this must be done sequentially, since random access memories need to be accessed one location at a time. In addition to the nine computer memory cycles required to simply fetch the nine pixel codes in each neighborhood, additional computer instruction cycles are required to execute whatever filtering algorithm is applied to the present neighborhood. Since the data rate of serial pixel input data usually is very high, for example 10 MHz, if filtered pixels are to be output as fast as unfiltered pixels are input, i.e., at 10 MHz, memory cycle rates of the order of 100 MHz would be required, which is impossible at the present state-of-the-art, at least if low cost commercially available microprocessors are to be utilized to execute the filtering algorithms.

The state-of-the-art is generally indicated in U.S. Pat. Nos. 4,484,349 (McCubbrey), 4,426,629 (Fouse), 4,363,104 (Nussemeier), 4,510,618 (Ataman et al), 4,506,382 (Hada et al), 4,499,598 (Chitineni), 4,499,597 (Alves), 4,398,256 (Nussemeier et al), 4,389,677 (Rushby et al), and 3,737,855 (Cutaia), and the publication "Real-Time Image Enhancement Using 3×3 Pixel Neighborhood Operator Functions" by Hall and Awtrey, Optical Engineering, May/June, 1980, Vol. 19 No. 3, Page 421.

It would be highly desirable to provide a low cost, primarily hardware (rather than primarily software) system for receiving high speed serial pixel data from a scanner, operating on successive adjacent three pixel by three pixel neighborhoods, and outputting filtered pixels at the same rate that the unfiltered pixels are serially input by the scanner. It also would be advantageous to have the capability of applying different filtering algorythms to different neighborhoods or groups of neighborhoods by simply supplying suitable filter selection signals.

SUMMARY OF THE INVENTION

Accordingly, it is an object of the invention to provide a pixel neighborhood processing system and method capable of receiving high speed serial input pixel code data, operating on neighborhoods of the input data, and outputting serial processed data at the same rate that the input data is received.

It is another object of the invention to provide a simple, low cost, primarily hardware implementation of a pixel neighborhood processor that serially outputs filtered pixels at the same rate that input pixels are serially received.

It is another object of the invention to provide a pixel neighborhood processor that provides convenient selection of filtering algorithms to be applied to each neighborhood.

Briefly described, and in accordance with one embodiment thereof, the invention provides a pixel processor including serially connected first, second, and third memories, and also including fourth, fifth, and sixth serially connected memories, and control circuitry for writing odd numbered rows of pixels into the first memory and even numbered rows of incoming pixels into the fourth memory, and circuitry for shifting odd numbered rows of pixels stored in the first and second memories into the second and third memories, respectively, simultaneously with the writing of even numbered rows of incoming pixels into the second memory. Similarly, circuitry is provided for shifting even numbered rows of pixels stored in the fourth and fifth memories into the fifth and sixth memories, respectively, simultaneously with the writing of odd numbered rows of pixels into the first memory. The outputs of the six memories are coupled to inputs of multiplexer circuitry. The outputs of the multiplexer circuitry are coupled to the inputs of three three-bit serial-to parallel-converters. The three outputs of the first serial-to-parallel converter represent the first row of a pixel neighborhood, the three ouputs of the second serial-to-parallel converter represent the second row of the same pixel neighborhood, and the outputs of the third serial-to-parallel converter represent the third row of the same neighborhood. The outputs of the three serial-to-parallel converters are gated to address inputs of a read only memory storing filter algorithms. Outputs of the read only memory represent output pixel data that is filtered in accordance with the stored filter algorithms or tables. A demultiplexer selects the desired pixel output. The apparatus presents the three by three pixel neighborhoods at the same data rate at which input pixels are supplied from a scanner to the device, causing the filtered outputs of the read only memory to also appear at the same data rate. Consequently, the demultiplexed or selected pixel output signal has the same data rate as the pixel inputs. Circuitry is provided to inhibit outputting of pixel data until the first and second rows of pixels and the first two pixels of the third row are written into the memories so that the first complete three by three pixel neighborhood is available before outputting of any filtered pixel data. Circuitry also is provided to automatically generate internal strobe signals needed to continue clocking of stored data through the memories after an "end of page" signal is received, allowing neighborhoods still stored in the memories to be filtered and converted to pixel output data. Gating circuitry applies logical "0" input levels to the address inputs of the read only memory as necessary to generate "dummy" left-hand columns for neighborhoods in which the object pixel is on the left-hand end of the stored pixel rows, and also includes circuitry for applying logical "0" levels to address inputs of the read only memory to provide a "dummy" right-hand column for neighborhoods of pixels at the right-hand end of the stored rows, allowing accurate filtering of the pixels at the beginning and end of every row.

DESCRIPTION OF THE INVENTION

As previously mentioned, FIG. 2 shows a typical three by three pixel neighborhood 2, utilized to determine a weighted average or filtered value of the center or object pixel P'i. The neighborhood 2 moves from left to right so that the center pixel P'i moves to the right by one pixel, forming a new neighborhood 3, forming a weighted average of the center pixel of the new neighborhood, and repeating the operation until the end of the present row is reached. The neighborhood then moves to the beginning of the next row so that P'i is located at the left or beginning side of the next row. As mentioned above, prior neighborhood processors that utilize computers to apply filter algorithms to produce a weighted or filtered average for that neighborhood require a great deal of computing time, so the data rate of the filtered pixels is much slower than that of the serially input pixel data unless extremely fast expensive computers are used.

Figure 3:
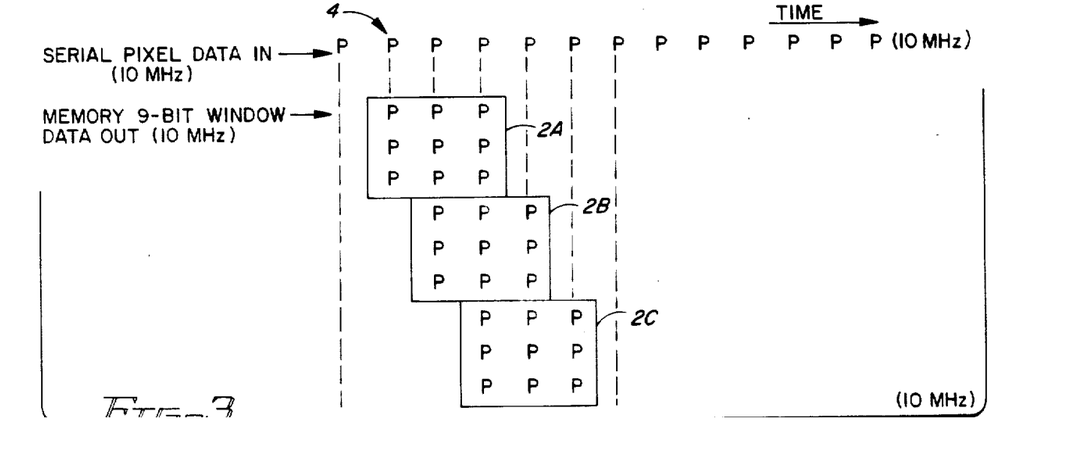
FIG. 3 is a diagram useful in explaining the operation of the neighborhood processor of the present invention.

An overview of how the neighborhood processor of the present invention works can be seen by reference to FIG. 3, wherein reference numeral 4 indicates a 10 MHz stream of serial input pixel code data. The pixel processor of the present invention produces a sequence of nine bit windows or neighborhoods in the sequence 2A, 2B, 2C, so that all nine pixels of each three by three successive neighborhood are output at the same 10 MHz data rate that the serial pixel data input is received. The nine bit memory window output then is utilized to address a read only memory that outputs a filtered pixel (i.e., pixel code) that corresponds to the present nine bit window (i.e , neighborhood) and represents the filtered value of the center pixel of the present or object neighborhood.

Figure 4A:
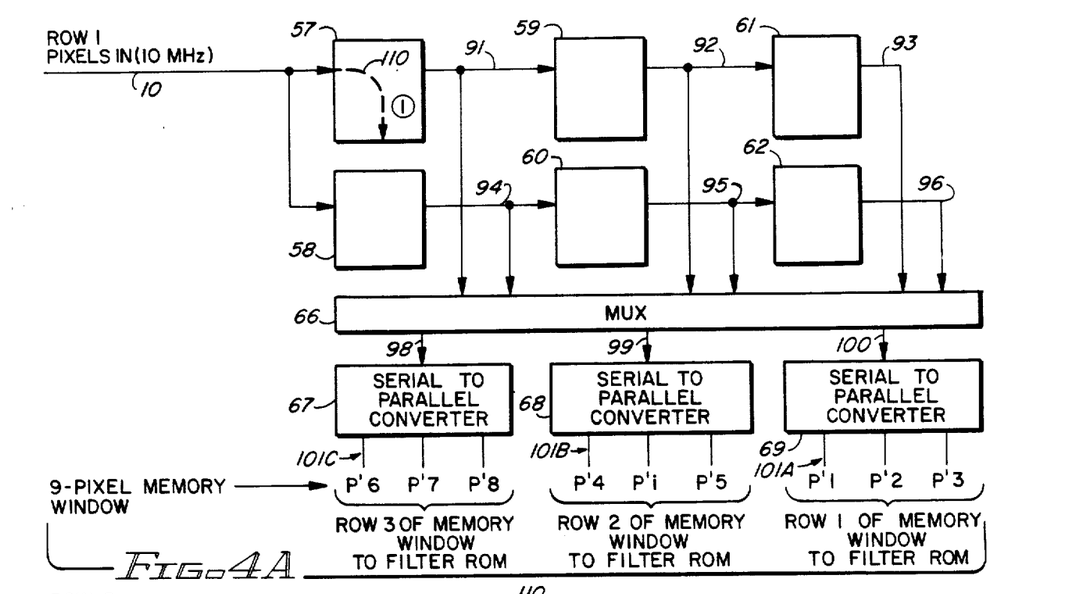
FIGS. 4A–4D are block diagrams useful in explaining the operation of the pixel processor of the present invention.

FIG. 4A discloses a block diagram of the basic components of the neighborhood processor of the present invention. Reference numeral 10A designates the conductor on which the pixel data input signal "PIXELS IN" is received from a suitable scanner, such as a document scanner at (for example) a 10 MHz data rate. Pixel input conductor 10A is connected to the data input terminal of a first serial memory or memory register circuit 57. The data output terminal of memory register 57 is connected by conductor 91 to the data input terminal of a second identical memory register circuit 59 and to an input of a multiplexer circuit 66. The data output terminal of memory 59 is connected by conductor 92 to the data input terminal of a third identical memory register circuit 61 and to another input of multiplexer circuit 66. The data output terminal of memory 61 is connected by conductor 93 to a third input of multiplexer 66.

Pixel input conductor 10A also is connected to the data input terminal of a fourth memory register circuit 58, the data output terminal of which is connected by conductor 94 to the data input terminal of a memory register circuit 60 and to a fourth input of multiplexer 66. The data output terminal of memory 60 is connected by conductor 95 to the data input terminal of memory 62 and to a fifth input of multiplexer 66 by conductor 95. Finally, the data output terminal of sixth memory 62 is connected by conductor 96 to the sixth input of multiplexer 66.

Multiplexer circuit 66 includes three two-input multiplexers, the output of the first multiplexer being connected to conductor 98, the output of the second multiplexer being connected to conductor 99 and the output of the third multiplexer being connected to conductor 100.

Conductor 98 is connected to the input of a serial-to-parallel converter 67, conductor 99 is connected to the input of a serial-to-parallel converter 68, and conductor 100 is connected to the input of a serial to parallel converter 69.

In the present embodiment of the invention, each of the memory register circuits 58–62 is a 16,384 word by one-bit random access memory having a single data input terminal and a single data output terminal. Each of the memory circuits 58–62 is connected to address circuitry so that it is operative as a FIFO (first in first out) memory, as explained later with reference to FIGS. 5A–5C. Each of serial to parallel converters 67–69 is a three bit shift register.

The result of the operation of the circuit of FIG. 4A is that at any time during operation of the circuit after the first two rows and the first two bits of the third row of pixel data have been written into and shifted into appropriate ones of the memory registers 57–62, the top row of the present neighborhood 2 (FIG. 2) appears at the three outputs of serial-to-parallel converter 69, hereinafter referred to as shift register 69, the middle row of neighborhood 2 appears at the three outputs of shift register 68, and the bottom row of neighborhood 2 appears at the three outputs of shift register 67.

The connection of shift register outputs 101A (P'1, P'2, and P'3), 101B (P'4, P'i, and P'5), and 101C (P'6, P'7, and P'8) to the address inputs of the above-described read only memory will be described with reference to FIGS. 5A–5C.

In FIG. 4A, dotted line 110 designates the serial writing of the first row of pixels (FIG. 1) into memory 57. The write control input of memory 58 is inhibited during reception of odd numbered rows of pixels on conductor 10A, while the write control input of memory 57 is enabled during the reception of odd numbered rows of pixel on conductor 10A. Thus, at the end of the first row of pixels, memory 57 has the first row of pixels stored therein.

Figure 4B:
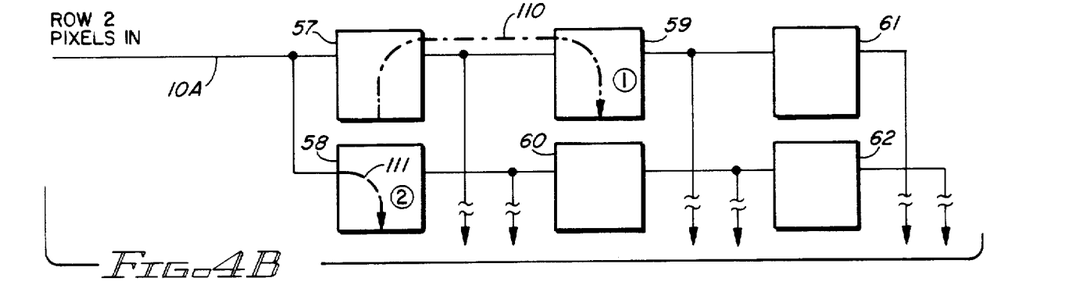

Then, an end of row (EOR) signal is received from the scanner. This reverses the above-mentioned write control signals, enabling the second row of pixels received on conductor 10A to be written into memory 58, as indicated by reference numeral 111 in FIG. 4B. At the same time, during reception of the second row of pixels on conductor 10A, the first row of pixels 110 is written from memory 57 into second memory 59, as also shown in FIG. 4A. This is accomplished by enabling the write control input of memory 59 and simultaneously addressing memories 57–62.

Figure 4C:
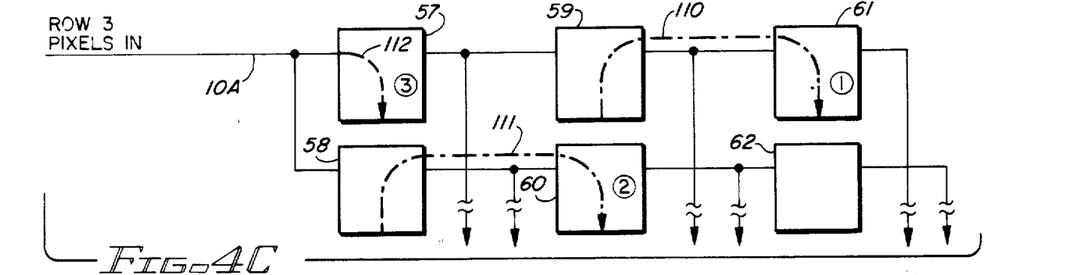
Figure 4D:
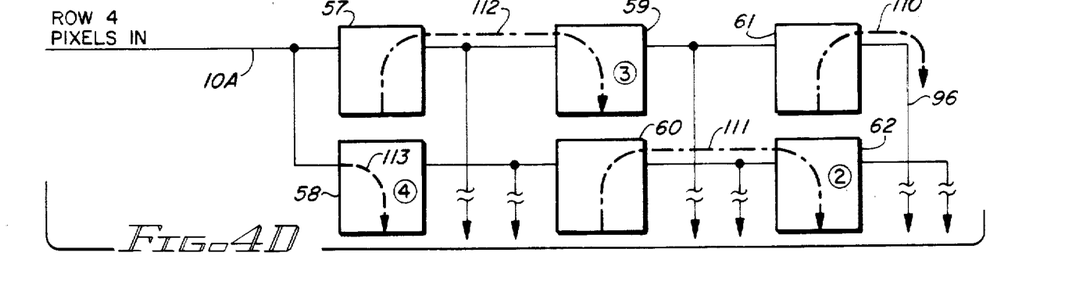

At the end of the second row of pixels, another EOR signal is generated, reversing the write control signals to the two "banks" of memory, the first bank including memories 57, 60, and 61, and the second bank including memories or registers 58, 59, and 63. The third row 112 of pixels then is written into first memory 57, as shown by reference numeral 112 in FIG. 4C. Simultaneously, the second row of pixels 111 is shifted out of fourth memory 58 and into fifth memory 60, as indicated by reference numeral 111 in FIG. 4C, and the first row of pixels 110 is simultaneously shifted out of second memory 59 into third memory 61. Another EOR signal is received, reversing the write control operation and resetting the address counting circuitry (described subsequently), and the fourth row 113 of pixels is written into fourth memory 58, while the third row 112 of pixels is shifted from first memory 57 into second memory 59, the second row of pixels 111 is shifted from fifth memory 60 to sixth memory 62, and the first row of pixels 110 is shifted out onto conductor 93.

The above-described loading of alternate rows of input pixel data into alternate banks of the memory circuits 57–62, and simultaneously serially shifting already loaded rows of pixels into other memories of the other bank continues until an end of page (EOP) signal is received.

The operation of multiplexer circuitry 66 and the three three bit serial to parallel shift registers 67–69 is simply to produce, at every new pixel time, a new "snap shot" of the last three pixels output on the three memories that are presently serially outputting pixels stored therein. Thus, a new three by three pixel neighborhood is produced on conductor groups 101A, 101B, and 101C (FIG. 4A) every pixel time, i.e., at a 10 MHz rate. It is then a simple matter to use the nine outputs of the three shift registers 67–69 as address inputs of a PROM (programmable read only memory) containing the desired "filtering" truth tables, and obtain filtered output pixel data at the 10 MHz data rate.

Figure 5A:
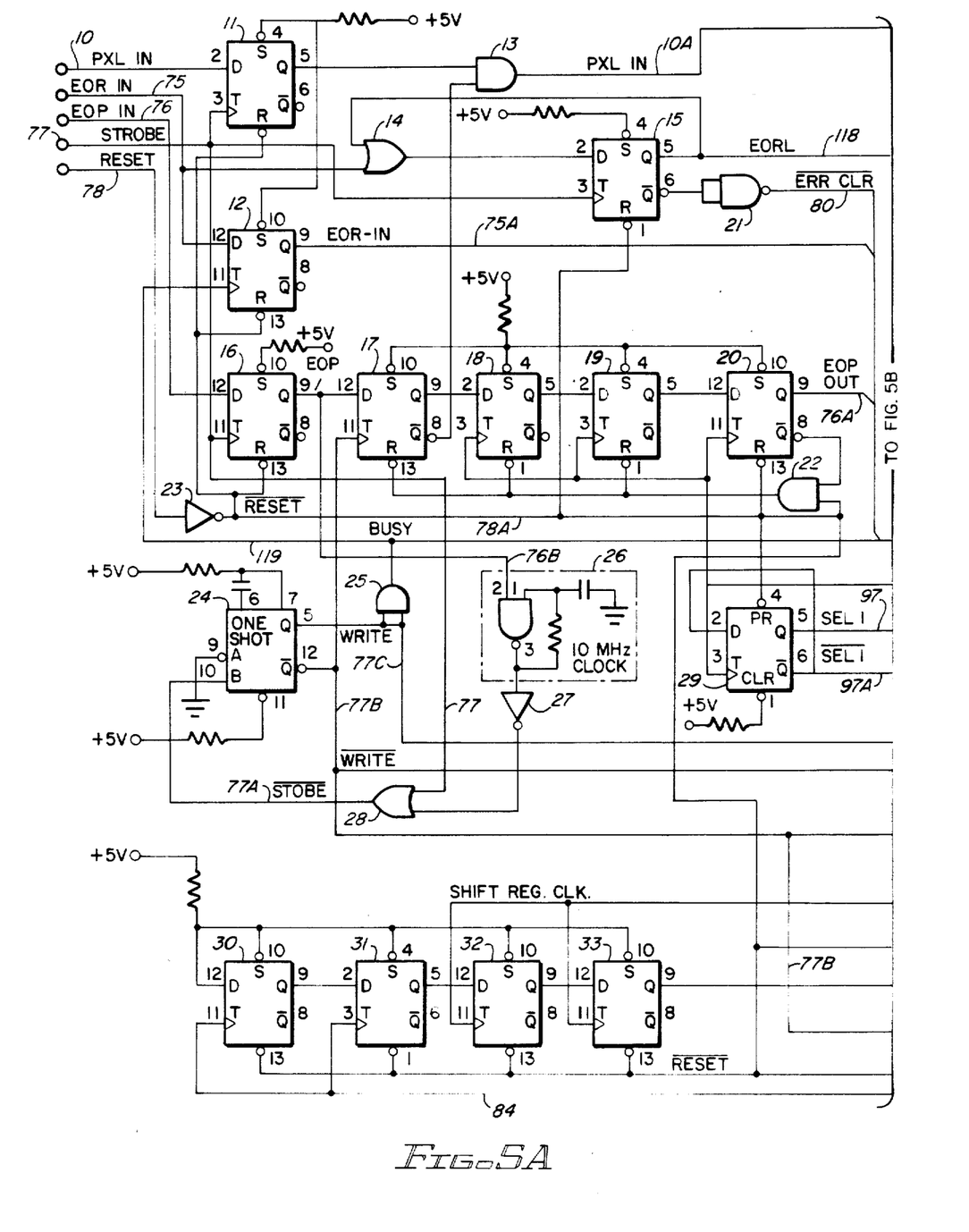
FIGS. 5A–5C constitute a detailed logic diagram of the neighborhood processor of the present invention.
Figure 5B:
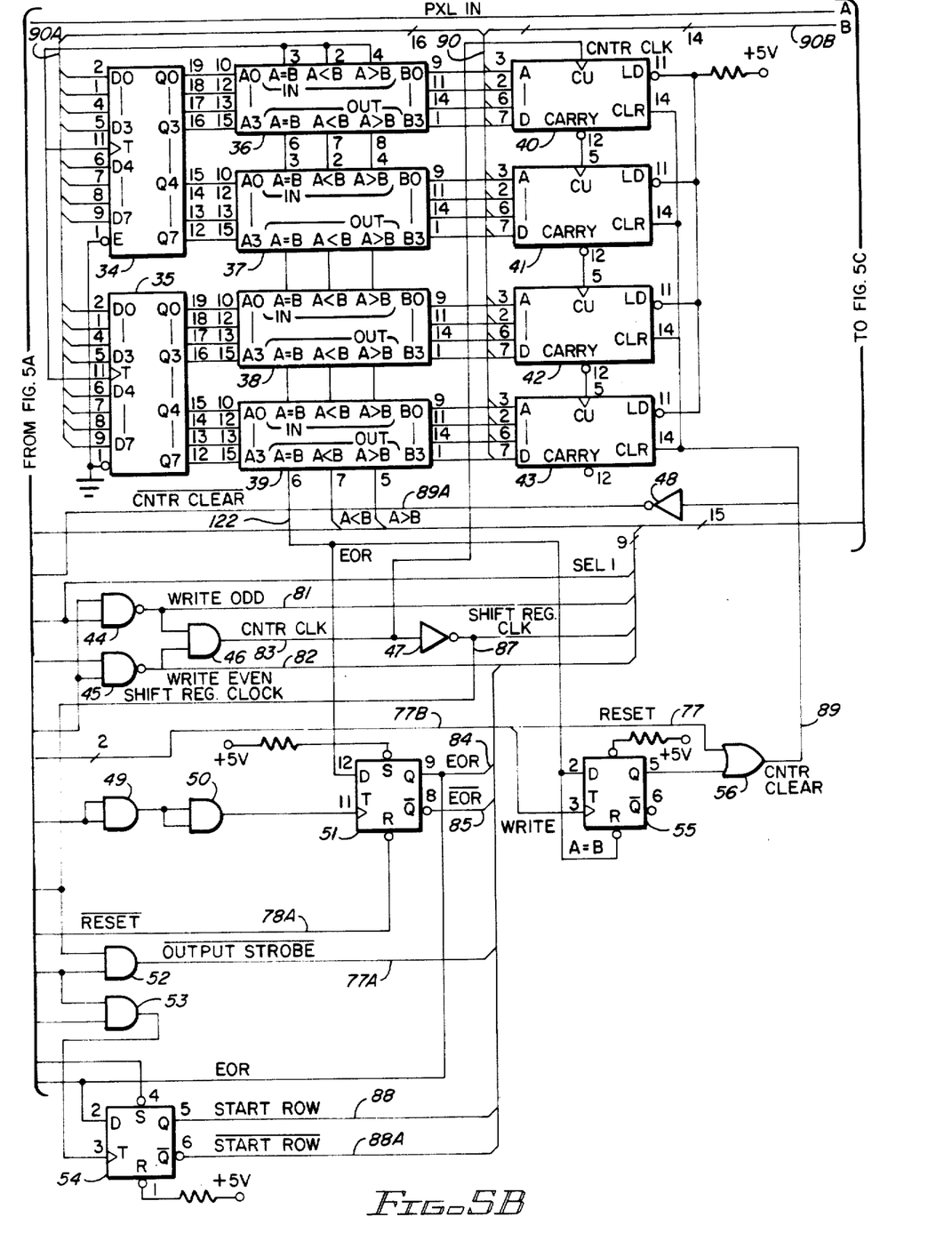
Figure 5C:
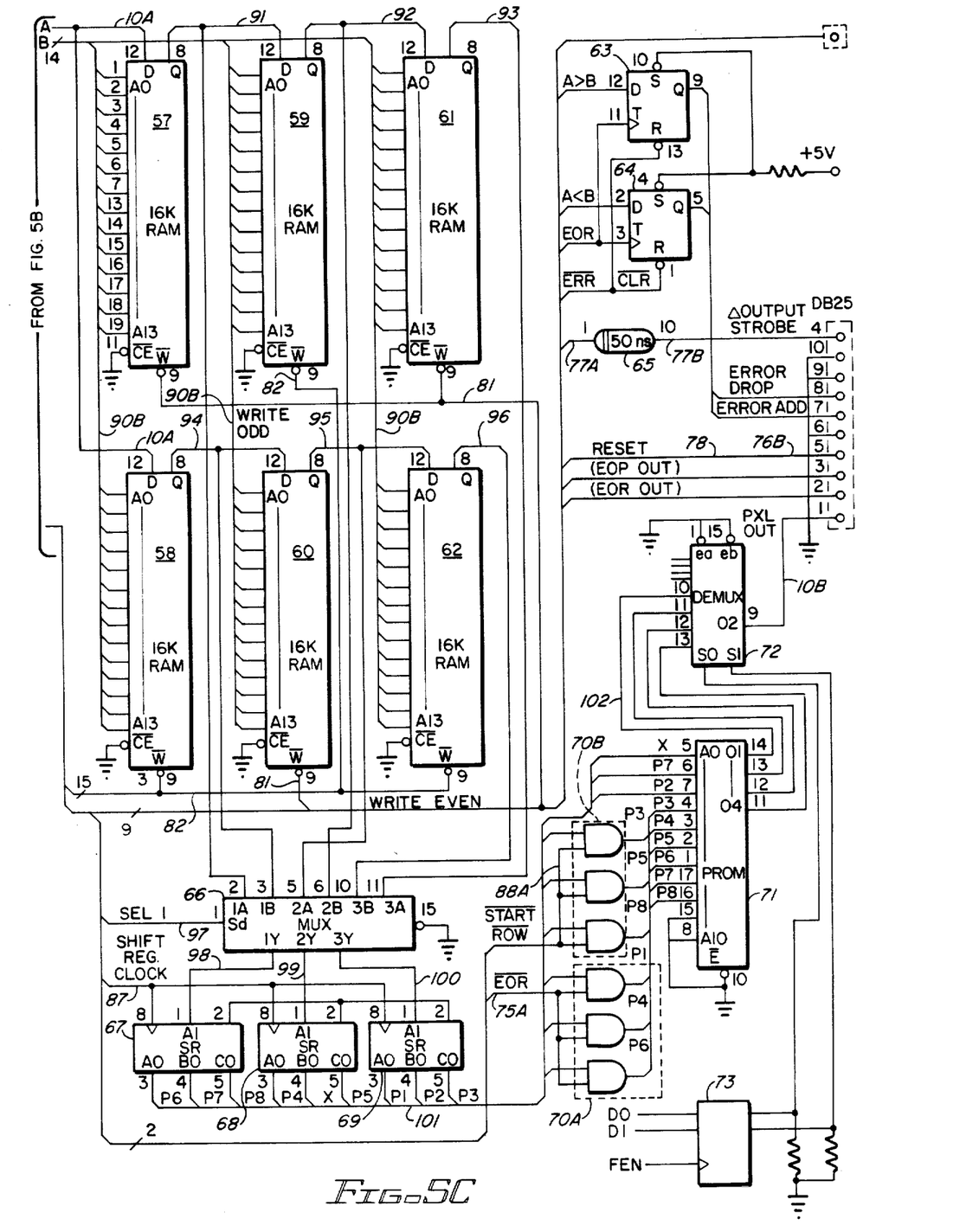

Referring now to FIGS. 5A–5C, the detailed structure of the present implementation of the entire neighborhood processor is disclosed, only a portion of which was shown in the block diagram of FIG. 4A. Referring first to FIG. 5A, five inputs from a suitable scanner include pixel input conductor 10 connected to the D input of a flip-flop or pixel input latch 11, EOR (end of row) conductor 75 connected to the D input of flip-flop 12 and to one input of OR gate 14, $EOP_{IN}$ (end of page) conductor 76 connected to the D input of flip-flop 16, STROBE conductor 77 connected to the trigger input of flip-flop 11, the trigger input of flip-flop 15, the trigger input of flip-flop 16, and one input of OR gate 28, and RESET conductor 78 connected to the input of inverter 23. The Q output of pixel input latch 11 is connected to one input of AND gate 13, the output of which produces a $PXL_{IN}$ signal on conductor 10A. As described above, $PXL_{IN}$ conductor 10A is connected to the data (D) inputs of 16 kilobit random access memories 57 and 58. The Q output of end of row latch 12 is connected to EOR conductor 75A. The Q output of end of page latch 16 is connected by ER conductor 76B to the D input of flip flop 17 and to one input of a two-input NAND gate in 10 MHz oscillator circuit 26. The R (reset) inputs of D type flip-flops 11, 12, and 16 all are connected by conductor 78A to the output of inverter 23, wherein the signal RESET* is produced. (Note that asterisks are used herein to designate logical complements of signals, since the printer used cannot overstrike.) The reset input of D type flip-flop 15 also is connected to conductor 78A, as is the reset input of D type flip-flop 20 and the preset input of D type flip-flop 29. Conductor 78A also is connected to one input of two input AND gate 22 and to the reset inputs of D type flip-flops 51, 54, 30, 31, 32, and 33.

The output of OR gate 14 is connected to the D input of flip-flop 15, the Q output of which is connected to conductor 118, on which an EORL (end of row latch) signal is produced. Conductor 118 is connected to the trigger (T) inputs of octal latches 34 and 35, which capture the "row count", i.e., the number of pixels per row of the scanned document or image, in response to the first EOR signal. Conductor 118 also is connected to the "A=B", the "A less than B", and the "A greater than B" inputs of digital comparator 36.

The Q* output of flip-flop 15 is connected by inverter 21 to conductor 80, on which an (ERR CLR)* signal, which is not related to the concept of the invention, is produced.

Conductor 118 also is connected to the other input of two input OR gate 14.

The Q output of D type flip-flop 16 is connected to the D input of flip-flop 17, the Q output of which is connected to the D input of flip-flop 18. The Q output of flip-flop 18 is connected to the D input of flip-flop 19, the Q output of which is connected to the D input of end of page latch 20. The trigger (T) inputs of flip-flops 18, 19, and 20 and also the trigger input of flip-flop 29 are connected to a (CNTR CLEAR)* (counter clear) signal on conductor 89A, which is connected to the output of inverter 48. The Q* output of flip-flop 20 is connected to one input of two input AND gate 22, the output of which is connected to the reset (R) inputs of flip-flops 17, 18, and 19.

The second input of the two-input NAND gate in oscillator circuit 26 is connected to an RC feedback circuit. The output of that NAND gate is connected to the input of inverter 27, the output of which is applied to one input of a two-input OR gate 28. The output of OR gate 28 is connected by conductor 77A to one input of write one-shot circuit 24. The Q output of write one-shot 24 is connected to both inputs of two-input AND gate 25 by write conductor 77C. Conductor 77C is also connected to one input of each of two-input NAND gates 44 and 45. The other input of NAND gate 44 is connected by conductor 97 to the Q output of flip-flop 29. The other input of NAND gate 45 is connected by conductor 97A to the Q* output of flip-flop 29.

The output of two-input AND gate 25, which is connected as a noninverting driver circuit, is connected to BUSY conductor 119, which is connected to the T input of flip flop 12.

The Q* output of write one-shot 24 is connected by conductor 77B to the T (trigger) input of flip-flop 17 and applies a WRITE* signal to the T input of counter clear flip-flop 55, to the input of buffer 49, the output of which is connected to buffer 50, the output of which is connected to the T input of flip-flop 51, and also to one input of two-input AND gate 53.

The D input of flip flop 29 is connected to the Q* output thereof by conductor 97A. The output of NAND gate 44 produces a WRITE ODD signal on conductor 81. Conductor 81 is applied to one input of two-input AND gate 46, the output of which produces a CNTR CLK (counter clock) signal on conductor 83, which is connected to the input of inverter 47 and to the "increment" input of counter 40, which can be a 74ALS193 integrated circuit manufactured by various suppliers. Inverter 47 produces a SHIFT REG CLK signal on conductor 87, which is connected to the T input of D type flip-flops 32 and 33, and to one input of two-input AND gate 52, the output of which produces an (OUTPUT STROBE)* signal on conductor 77A.

The output of NAND gate 45 produces a WRITE EVEN signal on conductor 82, which is applied to the other input of two-input AND gate 46.

The input of inverter 48 is connected by conductor 89 to the output of two-input OR gate 56, which produces a CNTR CLEAR (counter clear) signal on conductor 89. Conductor 89 is also connected to the CLR (clear) inputs of address counters 40, 41, 42, and 43. One input of OR gate 56 is connected to RESET conductor 77. The other input of OR gate 56 is connected to the Q output of flip-flop 55. The reset (R) input and the D input of flip-flop 55 are connected by conductor 122 to an EOR signal produced at the "A=B" output of digital comparator 39. The D input of EOR flip-flop 51 also is connected to EOR conductor 122. The Q output of flip-flop 51 is connected to EOR conductor 84, and the Q* output thereof is connected to EOR* conductor 85.

Flip-flop 30 has its D input connected to +5 volts, its T input connected to EOR conductor 84, and its Q output connected to the D input of flip-flop 31. The T input of flip-flop 31 is connected to conductor 84 and its Q output is connected to the D input of flip-flop 32. The Q output of flip-flop 32 is connected to the D input of flip-flop 33 the Q output of which is connected to the other input of two-input AND gate 52 and to the other input of two-input AND gate 53. EOR conductor 84 also is connected to the D input of flip-flop 54, the T input of which is connected to the output of AND gate 53. The Q output of flip-flop 54 is connected to START ROW conductor 88, and its Q* output is connected to the (START ROW)* conductor 88A.

The CARRY output of counter 40 is connected to the CU (count up) input of an identical counter 41. Its CARRY output is connected to the CU input of counter 42, the CARRY output of which is connected to the CU input of counter 43. The four outputs A-D of counters 40, 41, 42, and 43 are connected, respectively, to the B0-B3 inputs of digital comparators 36, 37, 38, and 39 respectively, and are also connected to the 16 D0-D7 inputs of the two octal latches 34 and 35. Fourteen of the address counter outputs 90B are connected to 14 address inputs A0-A13 of each of 16K memories 57-62.

The Q0-Q7 outputs of each of the octal latches 34 and 35 are connected, in groups of four, to the A0-A3 inputs of comparators 36, 37, 38, and 39. Comparators 36-39 can be a 74LS85 integrated circuits manufactured by various suppliers. Their respective "match," "greater than," and "less than" inputs are cascaded, as shown.

The write control (W*) inputs of each of memories 57, 60, and 61 receive the WRITE ODD signal on conductor 81, while the W* inputs of memories 58, 59, and 62 are connected by conductor 82 to the WRITE EVEN signal.

The data output terminals Q of memories 57, 59, and 61 are connected by conductors 91, 92, and 93, respectively, to the 1A, 2B, and 3A inputs of multiplexer 66. The Q outputs of memories 58, 60, and 62 are connected by conductors 94, 95, and 96, respectively to the 1B, 2A, and 3B inputs of multiplexer 66, which can be a 74LS157 integrated circuit manufactured by various suppliers. The select input of multiplexer 66 is connected to conductor 97, which conducts the SEL1 signal produced by flip-flop 29. The 1Y, 2Y, and 3Y outputs of multiplexer 66 are connected by conductors 98, 99, and 100 to the serial inputs of three-bit shift registers 67, 68, and 69 respectively, the outputs of which produce the pixel signals P6, P7, P8, P4, X, P5, P1, P2, and P3, respectively. These inputs are applied to separate inputs of three two-input AND gates 70A, as shown, and to another group of two-input AND gates 70B, also as shown. The other input of each of AND gates 70A is connected to EOR* conductor 75A while the other input of each of AND gates 70B is connected to the START ROW signal on conductor 88A. The outputs of AND gates 70A and 70B are connected to the address inputs of programmable read only memory (PROM) 71, which can be a 63S841 integrated circuit manufactured by Monolithic Memories, Inc. The P7, X, and P2 outputs of the three-bit shift registers 67, 68, and 69 are connected to the A0-A2 inputs of PROM 71. The four outputs of PROM 71 are connected to the four inputs of a demultiplexer 72, which can be a 74LS153 integrated circuit manufactured by various suppliers. The selected output, which is selected in response to the signals from the D0 and D1 inputs of a computer bus (not shown), received from latch 73, produces the selected one of the four PROM outputs on pixel output conductor 10B.

Flip-flop 63 and 64 perform an error indicating function that is not related to the concept of the invention. Fifty nanosecond delay line 65 delays the output strobe signal produced on conductor 77A by 50 nanoseconds to match the delay through gates 70A, 70B, PROM 71, and demultiplexer 72 so that the output of neighborhood processor circuit of FIGS. 5A-5C looks like the outputs of another scanner. This feature enables a plurality of identical devices to be cascaded to produce suitable successive stages of filtering of the pixel output data serially produced on conductor 10B.

In operation, the circuit of FIGS. 5A-5C receives the pixel data from conductor 10. The pixel data is latched into pixel latch or flip-flop 11 by the STROBE signal on conductor 77, which also latches the EOR pulse into flip-flop 12. The STROBE pulse also triggers flip-flop 15 to perform the function of producing the above-mentioned EORL signal on conductor 118 to capture the address count, i.e., the number of pixels per row, in counters 40-43 in latches 34 and 35 at the end of the first row of pixels. The EORL signal also is used as enable to the "compare" inputs of the digital comparators 36-39 to to determine whether the end of a row of pixels has been reached.

The STROBE pulse also latches in the "end of page" signal EOP$_{IN}$ on conductor 76 into latch 16. When all of the pixel data for a particular scanning operation has been completed, the EOP$_{IN}$ signal on conductor 76 is latched into end of page latch 16. Its Q output on conductor 76B enables the internal 10 MHz clock circuit. Then the STROBE pulse on conductor 77 ceases, but the output of inverter 27 produces a second internally generated strobe signal which continues to be gated through OR gate 28 to conductor 77A, just as the STROBE signal on conductor 77 was prior to the EOP$_{IN}$ signal. All internal operation based on the occurrence of a WRITE signal and a WRITE* signal on conductors 77C and 77B, respectively, now continues until all neighborhoods stored in the memories 57-62 have been processed, even though no more signals are provided on any of the input conductors 10, 75, 76, 77, and 78.

The above-mentioned alternating of the writing and readout operations between the first memory bank 57, 59, 61 and the second memory bank 58, 60, 62 is performed in response to the WRITE signal on conductor 77C as a result of a CNTR CLEAR signal on conductor 89, which is inverted by inverter 48 and applied by conductor 89A to the T input of flip-flop 29, which switches state each time an end of row condition is detected by comparators 36-39. Every time either a WRITE ODD or a WRITE EVEN pulse appears on conductor 81 or 82, a CNTR CLK signal appears on conductor 83, generating the SHIFT REG CLK signal on conductor 87. Then, every time the addresses in address counters 40-43 match the earlier captured end of row count stored in latches 34 and 35, the EOR signal on conductor 122 is produced by the output of comparator 39. This generates the EOR signal on conductor 84 and also causes flip-flop 55 and OR gate 56 to generate the CNTR CLEAR signal on conductor 89.

Figure 6A:
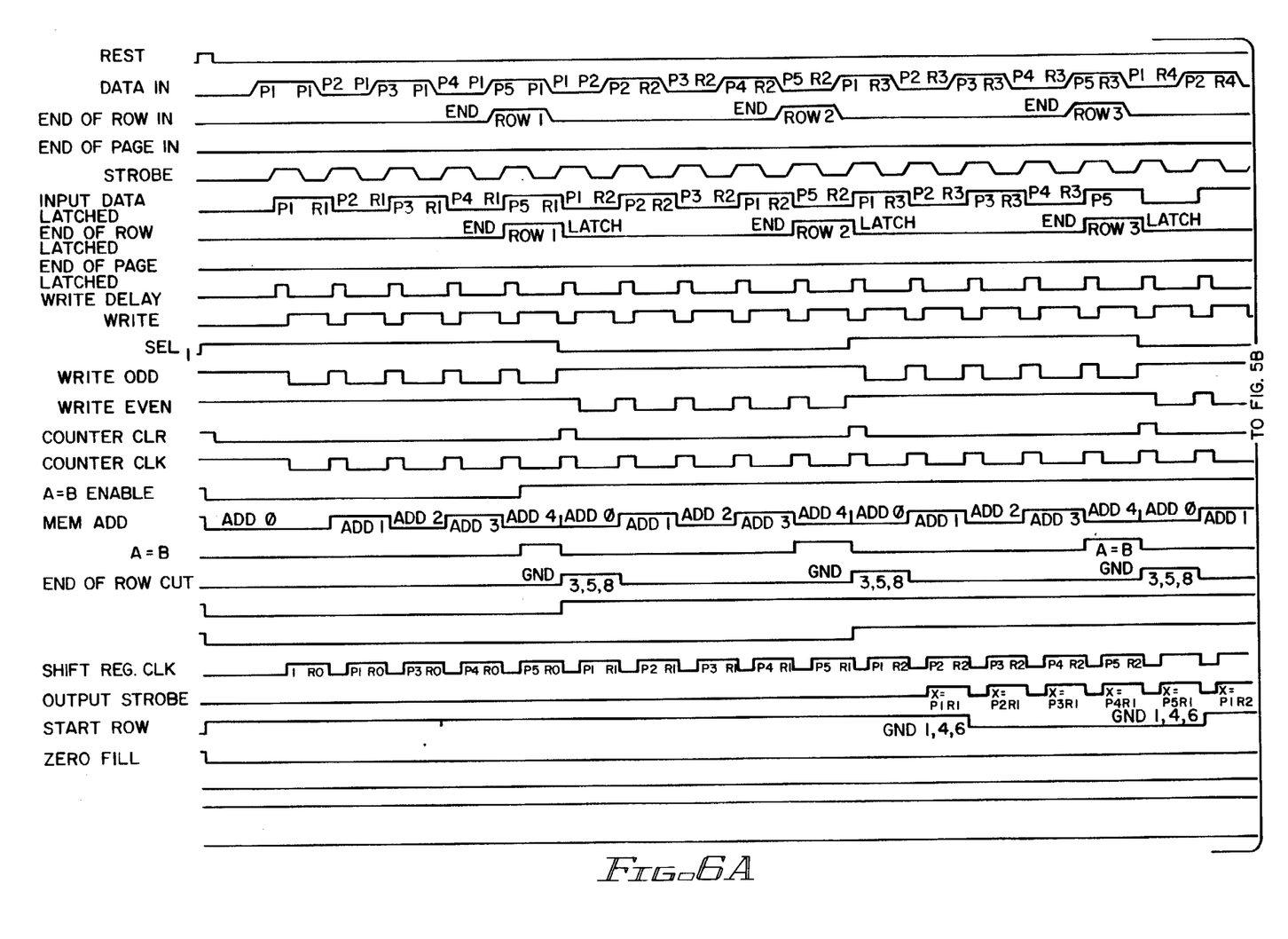
FIGS. 6A and 6B constitute a timing diagram that illustrates the operation of the circuit of FIGS. 5A–5C.
Figure 6B:
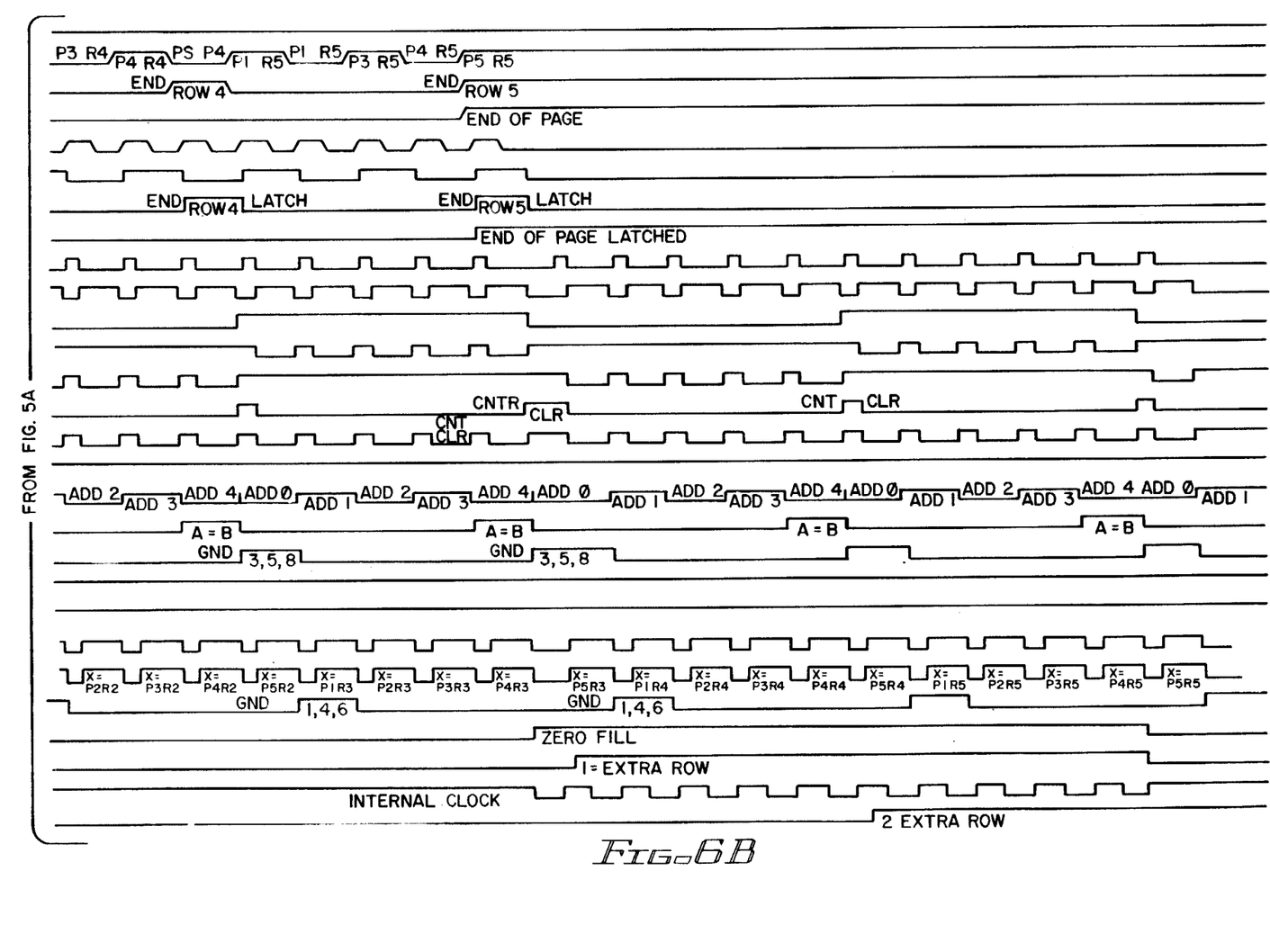

The CNTR CLK signal on conductor 83 causes all of the address counters 40-43 to be continually incremented at the STROBE rate (see FIGS. 6A and 6B) until the end of row count stored in latches 34 and 35 is again attained, signaling the end of scanning of the present row of pixels and beginning scanning of the next row.

As the first pixel STROBE signal comes in, the address counters 40-43 all initially store logical "0"s. Each successive STROBE pulse causes a new WRITE pulse to be produced, and in response to that, a new CNTR CLK pulse is produced. The CNTR CLK pulse then increments the address of the memory counters 40-43. At the end of the first row, the EORL signal is produced on conductor 118 "capturing" the count of all of the address counters 40-43 in the corresponding count latches 34 and 35. This happens only once, because the EORL signal on conductor 118 then disables the D input of flip-flop 15 by means of OR gate 14.

The EOR signal generated by digital comparator 39 on conductor 122 by the match at the A and B inputs of the comparators 36-39 generates the CNTR CLEAR signal that resets address counters 40-43 at the end of the first row of pixels. The WRITE ODD signal on conductor 81 goes to a "0" and the WRITE EVEN signal on conductor 82 goes to a "1", causing the next row of pixels to be written into memory 58, instead of memory 57, and also enables the above described transfers by enabling the second bank of memories 58, 59, and 62, as previously explained.

It should be appreciated that no useful "neighborhood" filtering operations can occur until the first row of pixel codes, the second row of pixel codes and two pixel codes of the third row all are stored in the memories 57-62. Even then, the first pixel neighborhood averaging must start with a neighborhood centered about the first pixel of the second row. This leads to the requirement of a left-hand dummy column which needs to be simulated so that there will be meaningful values for the surrounding eight pixels. This is accomplished by using the START ROW signal produced on conductor 88 and the (START ROW)* signal produced on conductor 88A in response to the EOR signal on conductor 84 applying it to the one input of each of the AND gates 70B, causing logical "0"s to appear for the P3, P5, and P8 pixels.

And likewise, at the end of a row, the EOR* signal on conductor 75A causes AND gates 70A to produce logical "0"s on the P1, P4, and P6 inputs of the PROM 71.

The two flip-flops 30 and 31 produce logical "1"s at their outputs in response to the first and second EOR signals received on conductor 84, respectively. This prevents any (OUTPUT STROBE)* signals from being produced on conductor 77A until the first two rows of pixels have been loaded into memories 57-62. Flip-flops 32 and 33 add two more pixel delays to alow loading of the first and second pixels of the third row into the memory. As the third pixel of the third row is loaded into the memories, the (OUTPUT STROBE)* signal on conductor 77A begins to occur as the first available neighborhood of the scanned pixel data (including the left-hand dummy column) now has been loaded into the memory.

A different situation occurs when an end of page signal EOP$_{IN}$ is received. When this occurs, not all of the neighborhood data stored in the memories 57–62 have yet been processed, but, as mentioned above, internal clocking and a continuation of the (OUTPUT STROBE)* signal on conductor 77B are required until all of the stored neighborhood data have been processed; there are still several rows of data left in the memory when EOP$_{IN}$ occurs. Then, it is necessary to "create" three more "artificial" end of row (EOR) signals. This is accomplished by means of the (CNTR CLEAR)* signal on conductor 89A, which is applied to the inputs of flip-flops 18, 19, and 20, which are cascaded so that the next three "artificial end of row conditions" are stored before the EOPOUT signal is produced on conductor 76A. At that point, all of the neighborhoods have been filtered, and the last pixel output signal has been produced on conductor 10B, and the circuit becomes inactive.

The above described circuitry thus provides a high speed, low cost hardware device that avoids the slowness and high cost of software-implemented pixel neighborhood processing of the prior art.

While the invention has been described with reference to a particular embodiment thereof, those skilled in the art will be able to make various modifications to the described embodiment without departing from the true spirit and scope of the invention. It is intended that other pixel neighborhood processors which are equivalent to the one described herein, in that they perform substantially the same function in substantially the same way to obtain the same result, are deemed to be within the scope of the invention. For example, even though only single bit pixel codes are described herein, obviously the circuitry could be modified to include multiple bit pixel codes. Other types of serial memories than the FIFO memory arrangement shown, such as true shift register memories, could be used instead of the 16K by one random access memories and associated addressing scheme.

I claim:

1. A method of filtering a stream of serial input data arranged as a plurality of alternate odd and even numbered segments each corresponding, respectively, to a plurality of odd and even numbered rows of the data, the method comprising the steps of:
    (a) providing a first group of FIFO memories including first, second, and third FIFO memories and a second group of memories including fourth, fifth, and sixth FIFO memories;
    (b) serially shifting bits of a first odd numbered segment out of the third FIFO memory and simultaneously serially shifting bits of a second odd numbered segment out of the first FIFO memory into the second FIFO memory, and simultaneously serially shifting bits of a first even numbered segment out of the fifth FIFO memory into the sixth FIFO memory, and simultaneously serially shifting bits of a second even numbered segment into the fourth FIFO memory;
    (c) simultaneously with step (b), serially shifting bits of the first odd numbered segment, the first even numbered segment, and the second odd numbered segment into first, second, and third serial-to-parallel converters;
    (d) serially shifting bits of the first even numbered segment out of the sixth FIFO memory, simultaneously serially shifting bits of the second odd numbered segment out of the second FIFO memory into the third FIFO memory, simultaneously serially shifting bits of the second even numbered segment out of the fourth FIFO memory into the fifth memory, and simultaneously serially shifting bits of a third odd numbered segment into the first FIFO memory;
    (e) simultaneously with step (d), serially shifting the bits of the first even numbered segment, the second odd numbered segment, and the second even numbered segment into the first, second, and third serial-to-parallel converters;
    (f) repeating steps (b) through (e) for successive alternate odd numbered and even numbered segments; and
    (g) repetitively operating upon outputs of the first, second, and third serial-to-parallel converters to address a read only memory storing filtering table, and producing a serial stream of filtered data at the data rate of the serial input data at an output of the read only memory.

2. The method of claim 1 including shifting segments corresponding to the first odd numbered row and first even numbered row and the first two bits of the second odd numbered row into appropriate ones of the FIFO memories before performing step (d).

3. The method of claim 2 including utilizing a strobe pulse received from a scanner to generate synchronous clocking signals to accomplish the serial shifting of steps (b) and (e), and sensing an end of row signal from the scanner to determine when the shifting of step (b) and the shifting of step (e) is complete.

4. The method of claim 3 including the step of detecting an end of page signal from the scanner and generating an auxiliary strobe pulse having the same characteristics as the strobe pulse and continuing to perform steps (b) and (e) until all of the bits of two more rows are shifted into the first, second, and third serial-to-parallel converters.

5. The method of claim 4 including operating the first, second, and third serial-to-parallel converters to produce three output each, the signals on which represent respective rows of 3 by 3 pixel neighborhoods which are produced at the same rate as the data rate of the serial input data.

6. The method of claim 5 including inhibiting the producing of the serial stream of filtered data until the first and second rows of pixels and the first two pixels of the third row are written into appropriate ones of the FIFO memories in order to allow a complete 3 by 3 pixel neighborhood to appear at the outputs of the first, second, and third serial-to-parallel converters before producing any filtered data by means of the read only memory.

7. The method of claim 6 including generating internal strobe signals to continue clocking of stored data through the FIFO memories after an end of page signal is detected in order to allow neighborhoods still stored in the FIFO memories to be output by the first, second, and third serial-to-parallel converters and filtered by means of the read only memory.

8. The method of claim 7 including producing dummy left-hand columns of pixels to be inclued in neighborhoods in which the center pixel is in the left end of a row, and also producing dummy right-hand columns of pixels to be included in neighborhoods in which the center pixel is at the right end of a row, in order to allow meaningful filtering of the input pixels at the beginning and end of each row.

9. A system for filtering a stream of serial input data arranged as a plurality of alternate odd and even numbered segments each corresponding, respectively, to a plurality of odd and even numbered rows of the data, the system comprising in combination:
   (a) a first group of FIFO memories including first, second, and third FIFO memories and a second group of memories including fourth, fifth, and sixth FIFO memories;
   (b) means for serially shifting bits of a first odd numbered segment out of the third FIFO memory and simultaneously serially shifting bits of a second odd numbered segment out of the first FIFO memory into the second FIFO memory, and simultaneously serially shifting bits of a first even numbered segment out of the fifth FIFO memory into the sixth FIFO memory, and simultaneously serially shifting bits of a second even numbered segment into the fourth FIFO memory;
   (c) first, second, and third serial-to-parallel converters;
   (d) means for serially shifting bits of the first odd numbered segment, the first even numbered segment, and the second odd numbered segment into the first, second, and third serial-to-parallel converters;
   (e) means for serially shifting bits of the first even numbered segment out of the sixth FIFO memory, serially shifting bits of the second odd numbered segment out of the second FIFO memory into the third FIFO memory, serially shifting bits of the second even numbered segment out of the fourth FIFO memory into the fifth memory, and serially shifting bits of a third odd numbered segment into the first FIFO memory;
   (f) means for serially shifting the bits of the first even numbered segment, the second odd numbered segment, and the second even numbered segment into the first, second, and third serial-to-parallel converters;
   (g) a read only memory storing a filtering table; and
   (h) means for repetitively operating upon outputs of the first, second, and third serial-to-parallel converters to address the read only memory to produce a serial stream of filtered data at the data rate of the serial input data at an output of the read only memory.

10. The system of claim 9 including means for shifting segments corresponding to the first odd numbered row and first even numbered row and the first two bits of the second odd numbered row into appropriate ones of the FIFO memories before addressing the read only memory.

11. The system of claim 10 including means responsive to a strobe pulse received from a scanner for generating synchronous clocking signals to accomplish the serial shifting the various segments into and out of the various FIFO memories, and means for sensing an end of row signal from the scanner to determine when shifting of certain complete segments into or out of various FIFO memories is complete.

12. The system of claim 11 including means for detecting an end of page signal from the scanner and generating an auxiliary strobe pulse having the same characteristics as the strobe pulse and continuing to effectuate shifting of the various segments until all of the bits of two more rows are shifted into the first, second, and third serial-to-parallel converters.

13. The system of claim 12 including means for operating the first, second, and third serial-to-parallel converters to produce three outputs each, the signals on which represent respective rows of 3 by 3 pixel neighborhoods which are produded at the same rate as the data rate of the serial input data.

14. The system of claim 13 including means for inhibiting the producing of the serial stream of filtered dat until the first and second rows of pixels and the first two pixels of the third row are written into appropriate ones of the FIFO memories in order to allow a complete 3 by 3 pixel neighborhood to appear at the outputs of the first, second, and third serial-to-parallel converters before producing any filtered data by means of the read only memory.

15. The system of claim 14 including means for generating internal strobe signals to continue clocking of stored data through the FIFO memories after an end of page signal is detected in order to allow neighborhoods still stored in the FIFO memories to be output by the first, second, and third serial-to-parallel converters and filtered by means of the read only memory.

16. The system of claim 15 including means for producing dummy left-hand columns of pixels to be included in neighborhoods in which the center pixel is in the left end of a row, and means for producing dummy right-hand columns of pixels to be included in neighborhoods in which the center pixel is at the right end of a row, in order to allow meaningful filtering of the input pixels at the beginning and end of each row.

* * * * *